United States Patent [19]
Krueger et al.

[11] Patent Number: 5,335,249
[45] Date of Patent: Aug. 2, 1994

[54] METHOD AND APPARATUS FOR SPREAD SPECTRUM COMMUNICATIONS

[75] Inventors: Thomas E. Krueger, Kirkland; Kenneth L. Astrof, Edmonds, both of Wash.

[73] Assignee: Seattle Silicon Corporation, Bellevue, Wash.

[21] Appl. No.: 99,058

[22] Filed: Jul. 29, 1993

[51] Int. Cl.⁵ ...................... H04B 7/216; H04B 1/64; H04B 17/00
[52] U.S. Cl. ........................................ 375/1; 455/62; 455/68; 455/69
[58] Field of Search ................. 375/1; 455/62, 68, 69, 455/70

[56] References Cited

U.S. PATENT DOCUMENTS

| | | | |
|---|---|---|---|
| 3,617,891 | 11/1971 | Covill | 455/69 |
| 4,309,771 | 1/1982 | Wilkens | 455/69 X |
| 4,870,699 | 9/1989 | Garner et al. | 455/62 X |
| 4,942,590 | 7/1990 | Terada | 375/1 |
| 5,022,046 | 6/1991 | Morrow, Jr. | 375/1 |
| 5,093,842 | 3/1992 | Gimlin et al. | 375/10 |
| 5,128,959 | 7/1992 | Bruckert | 375/1 |
| 5,131,006 | 7/1992 | Kanerman et al. | 375/1 |
| 5,208,829 | 5/1993 | Soleimani et al. | 375/1 |
| 5,210,771 | 5/1993 | Schaeffer et al. | 375/1 |
| 5,216,692 | 6/1993 | Ling | 375/1 |
| 5,224,120 | 6/1993 | Schilling | 375/1 |

Primary Examiner—Gilberto Barron, Jr.
Attorney, Agent, or Firm—Graybeal Jackson Haley & Johnson

[57] ABSTRACT

A method and apparatus for providing spread spectrum communications. The apparatus starts with designated spread spectrum communications parameters, such as default transmitted power level, pseudo-noise (PN) sequence, PN sequence length, and frequency channel, having values which are chosen to ensure that spread spectrum communications can be carried out between a first station and a second station. The apparatus of the invention then changes the values of the spread spectrum communications parameters to the minimum values necessary to provide a given level of communications reliability. If the conditions facing the spread spectrum communication system change so that communications reliability falls below the given level, the apparatus resets the values of the spread spectrum communications parameters to the default levels and begins again to change their values to provide the given level of communications reliability. If the apparatus establishes that communications can reliably be carried out with narrowband communications techniques, the apparatus changes the parameters to provide narrowband communications at the minimum acceptable power level.

23 Claims, 9 Drawing Sheets

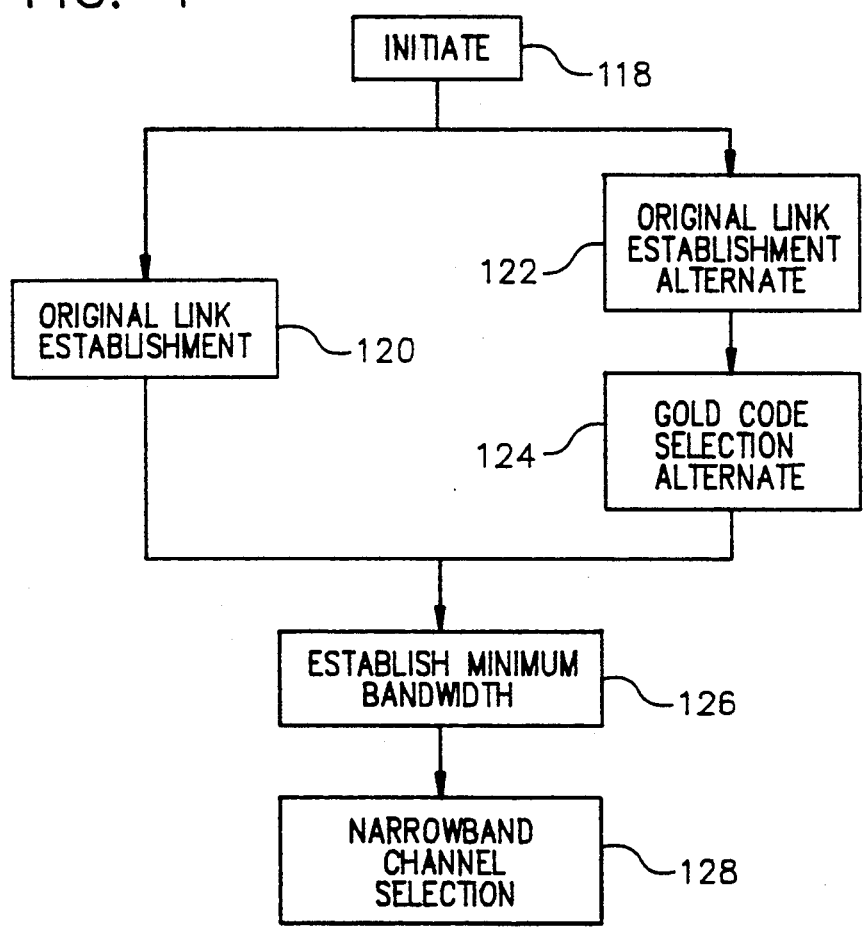

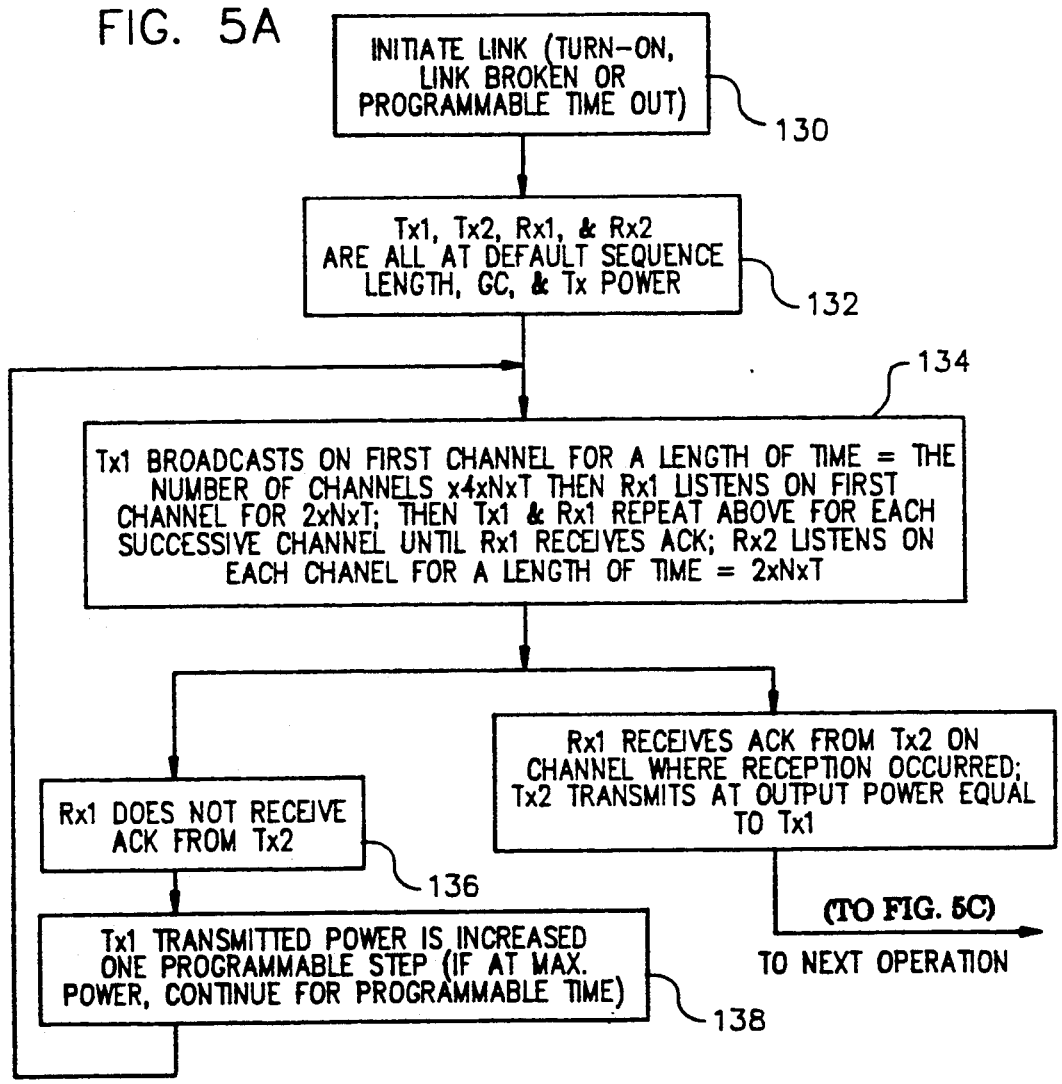

METHOD AND APPARATUS FOR SPREAD SPECTRUM COMMUNICATIONS

FIELD OF THE INVENTION

This invention relates to a method and apparatus for promoting communications, and more particularly, to a method and apparatus for promoting spread spectrum communications.

BACKGROUND

Conventional communication systems typically operate on the premise that concentrating communication energy to a narrow bandwidth overcomes conflicts with other communication systems sharing the same frequency band by avoiding the specific frequencies that the other communication systems are using. Spread spectrum communication systems have been developed to provide enhanced communications capabilities by spreading the communication energy over a relatively wide bandwidth, rather than concentrating the communication energy in a relatively narrow bandwidth.

A spread spectrum communication system reduces conflicts with conventional communication systems by having a very low energy density at any particular frequency. Conflicts are reduced because a conventional narrowband receiver tuned to a particular frequency will preferentially respond to a narrowband signal at that frequency (especially when using a frequency modulation technique, due to the "capture efect"), while a spread spectrum communication system receiver that is adapted to receive signals spread over a relatively wide bandwidth (in a manner to be described below) preferentially responds to spread spectrum communication signals.

An important factor in the operation of a spread spectrum communication system is the manner in which the communication energy is distributed over the available (relatively wide) frequency bandwidth. Spread spectrum communication systems use conventional carrier modulation techniques to apply the information to be transmitted to the carrier frequency. The information can be in analog or digital form. If the information is supplied in digital form, its rate is known as the data rate. After the first modulation, however, a spreading code is then applied to the information-modulated carrier [a "chipping rate"] to spread the communication energy over the wide bandwidth available to the spread spectrum communication system.

There are essentially four ways in which the carrier is spread out. These are frequency hopping, direct sequence, chirp, and time hopping. In the frequency hopping technique, a pseudo-random list of distinct channels is developed and the information-modulated carrier is made to hop from one channel to the next according to the list. In the direct sequence approach, a pseudo-random sequence is mixed with the carrier in order to change the phase or frequency of the information-modulated carrier at a very fast rate. If the phase shifting (phase shift-keying) is accomplished by a balanced mixer, and the pseudo-random sequence is a binary sequence, the phase shifting is typically produced by shifting the information-modulated carrier between 0 and 180 degrees (binary phase-shift keying—BPSK). Quadrature phase-shift keying (QPSK), in which the information-modulated carrier is shifted among four different phases is another common technique of direct sequence spread spectrum communications. Other forms of modulation are quadrature amplitude modulation (QAM), frequency shift-keying (FSK), and multiple phase shift-keying (MPSK). Chirp spread spectrum causes the frequency of the information-modulated carrier to be swept along predetermined frequency ranges. Time hopping operates by causing the information-modulated carrier to be keyed on and off at a very low duty cycle, in accordance with a pseudo-random binary sequence. The spread of the signal is established by the keying speed.

It is also possible to have hybrid spread spectrum communication systems, in which desirable features of two or more of the four most common spreading techniques briefly described above can be combined to suit particular circumstances. Further details of spread spectrum communication systems are given in "Spread Spectrum Systems," by R. C. Dixon, John Wiley and Sons, New York, 1984; "Spread Spectrum Techniques," by R. C. Dixon, IEEE Press, Piscataway, New Jersey; and "Coherent Spread Spectrum Systems," by Holmes, Wiley Interscience, New York, 1982. These references are hereby incorporated by reference.

One important aspect of many common spread spectrum communication systems is the development of the pseudo-random (PN) sequence which is used to spread the information-modulated carrier signal. Typically, the PN sequence chosen in a particular spread spectrum communication system has desirable statistical properties which allow the signals transmitted by the particular system to be suitably distinguished from the signals transmitted by other communication systems. In addition, choices of PN sequences can affect speed of acquiring synchronization of the received signals, which relate to the efficiency of initiating interpretation of the received signals. Common PN sequences are m-sequences, Thue-Moore sequences, and Gold sequences. Their choice and implementation are discussed in "Shift Register Sequences," by S. Golomb, Aegean Park Press, Laguna Hills, California, 1982. Excellent general references to spread spectrum communication systems are "Spread-Spectrum Applications in Amateur Radio," by W. E. Sabin, QST, ARRL, Newington, Connecticut, July, 1983; "Spread Spectrum Theory and Projects," 1993 ARRL Handbook, ARRL, Newington, Connecticut, 1993; "The Spread Spectrum Concept," by R. A. Scholtz, IEEE Trans. on Comm., IEEE, Vol. COM-25, No. 8, August 1977, Piscataway, New Jersey; and "The Origins of Spread Spectrum Communications," IEEE Trans. Comm., May 1982, pp. 822–854, Piscataway, New Jersey. Each of these five further references is also hereby incorporated by reference.

In commercial communications systems, spread spectrum techniques inhibit the casual listener from deciphering transmitted digital data. However, security is not normally a major goal in implementing a digital data spread spectrum system, since the data can easily be encrypted in software before it modulates the carrier signal.

While spread spectrum systems distribute communication energy over a wider bandwidth than narrowband communication systems and consequently benefit an independent co-frequency receiver, they also impair an independent adjacent frequency user. The amount of impairment is dependent upon the relative strengths of the desired and undesired signals at the receiver as well as various spread spectrum parameters that describe each of the channels used in a particular spread spectrum communication system. The relative powers of the desired and undesired signals are affected by transmitter and receiver antenna patterns and the relative positions of the desired and undesired transmitters (also known as the near/far problem).

In addition to reducing the effects of fading on frequency modulation signals due to multipath interference, a spread spectrum communication system reduces intersymbol interference due to ghosting (a particularly important consideration at data rates greater than about 1 megabit per second).

The Federal Communications Commission has allowed unlicensed operation of wireless communication systems in the frequency ranges of 902-928 MHz, 2400-2483.5 MHz, 5725-5850 MHz and 24.0-24.25 GHz If such a system is a narrowband system, it is limited to a maximum transmitted power of 0.75 milliwatt (mW) (although if the output signal is adequately scrambled, above 1000 MHz, the maximum transmitted power can be up to 100 mW). However, if the system is a spread spectrum system, its output power is limited to a much greater maximum of 1 watt (W).

What are unknown in the prior art are methods and apparatus for modifying the transmitter and receiver modulation as well as the transmitted power parameters to achieve the desired data rate of a spread spectrum communication system while minimizing interference to other operating wireless communication systems.

SUMMARY OF THE INVENTION

In one aspect, the invention is a method for communicating between a first station and a second station over a plurality of communication channels. The first station includes a first transmitter and a first receiver and the second station includes a second transmitter and a second receiver. The second receiver at the second station sequentially monitors each of the channels in the plurality of communication channels for communication signals transmitted by the first transmitter at the first station for a predetermined period of time.

The method comprises the steps a)-h). Step a) is to initiate the establishment of a link of communication channels between the first station and the second station. Each of the communication channels of the link is characterized by a predetermined set of spread spectrum parameters. Each parameter takes a value in a range of values such that the communication reliability of a communication channel changes monotonically as the value of the corresponding parameter changes from one extreme of the range to the other extreme of the range. Step b) is to determine whether the link is established between the first station and the second station. Step c) is to broadcast communication signals, if the link is not established, from the first transmitter to the second receiver over a first one of the plurality of communication channels for a period of time equal to the total period of time over which the second receiver monitors the channels in the plurality of communication channels. Step d) is, if the link is not established after performing step c), to change one of the parameters in at least one of the predetermined sets of spread spectrum parameters at the first station and returning to step b). Step e) is, if the link is established after performing step c), to change the one of the parameters in the at least one of the predetermined sets of spread spectrum parameters at the second station. Step f) is to monitor the spread spectrum parameters associated with each channel in the plurality of communication channels to determine which channel in the plurality of communication channels is characterized by spread spectrum parameters, at least one of which has a critical value that establishes a communication reliability that is the smallest possible greater than a predetermined communication reliability between the first station and the second station. Step g) is to transmit a communication signal from the first station to the second station, the communication signal including information identifying which channel in the plurality of communication channels has a spread spectrum parameter that has a critical value. Finally, step h) is to cause the first and second transmitters and the first and second receivers to change to the channel in the plurality of communication channels that has the spread spectrum parameter that has a critical value.

In another aspect, the invention is an apparatus for communicating between a first station and a second station over a plurality of communication channels. The first station includes a first transmitter and a first receiver, and the second station including a second transmitter and a second receiver. The second receiver at the second station sequentially monitors each of the channels in the plurality of communication channels for communication signals transmitted by the first transmitter at the first station for a predetermined period of time. The apparatus comprises means for initiating a link of communication channels between the first station and the second station, each of the communication channels of the link using a predetermined set of spread spectrum parameters. Each parameter takes a value in a range of values such that the communication reliability of a communication channel changes monotonically as the value of the corresponding parameter changes from one extreme of the range of the other extreme of the range. The apparatus also comprises means for determining whether the link is established between the first station and the second station. Further, the apparatus comprises means for broadcasting communication signals from the first transmitter to the second receiver over a first one of the plurality of communication channels for a period of time equal to the total period of time over which the second receiver monitors the channels in the plurality of communication channels, if the link is not established. Still further, the apparatus comprises means for changing one of the parameters in at last one of the predetermined sets of spread spectrum parameters at the first station if the link is not established. Additionally, the apparatus comprises means for changing the one of the parameters in the predetermined set of spread spectrum parameters in the at least one of the predetermined sets of spread spectrum parameters at the second station. Also, the apparatus comprises means for monitoring the spread spectrum parameters associated with each channel in the plurality of communication channels to determine which channel in the plurality of communication channels is characterized by spread spectrum parameters, at least one of which has a critical value that establishes a communication reliability that is the smallest possible greater than a predetermined communication reliability between the first station and the second station. Even further, the apparatus comprises means for transmitting a communication signal from the first station to the second station, the communication signal including information identifying which channel in the plurality of communication channels has a spread spectrum parameter that has a critical value. Finally the apparatus comprises means for causing the first and second transmitters and the first and second receivers to change to the channel in the plurality of communication channels that has the spread spectrum parameter that has a critical value.

BRIEF DESCRIPTION OF THE DRAWINGS

FIG. 4 is a flow chart of the overall method of the present invention.

FIGS. 5A-5E are a detailed flow chart of the overall method of the present invention.

DETAILED DESCRIPTION OF THE PREFERRED EMBODIMENT

The overall spread spectrum system of the present invention can achieve the data rate while minimizing interference to other operating wireless systems through the use of various techniques. These techniques include changing the transmitted power level PN sequence, PN sequence length, and frequency channel. Preferred embodiments of these techniques will be described in the following detailed description in sufficient detail that will be understandable to one skilled in the art of spread spectrum communication system design. However, those skilled in the art of spread spectrum communication system design will be able to specify further embodiments of communication systems in accordance with the concepts described in the following detailed description and appended claims. Accordingly, the scope of the present invention is to be limited only by the claims.

Figure 1:
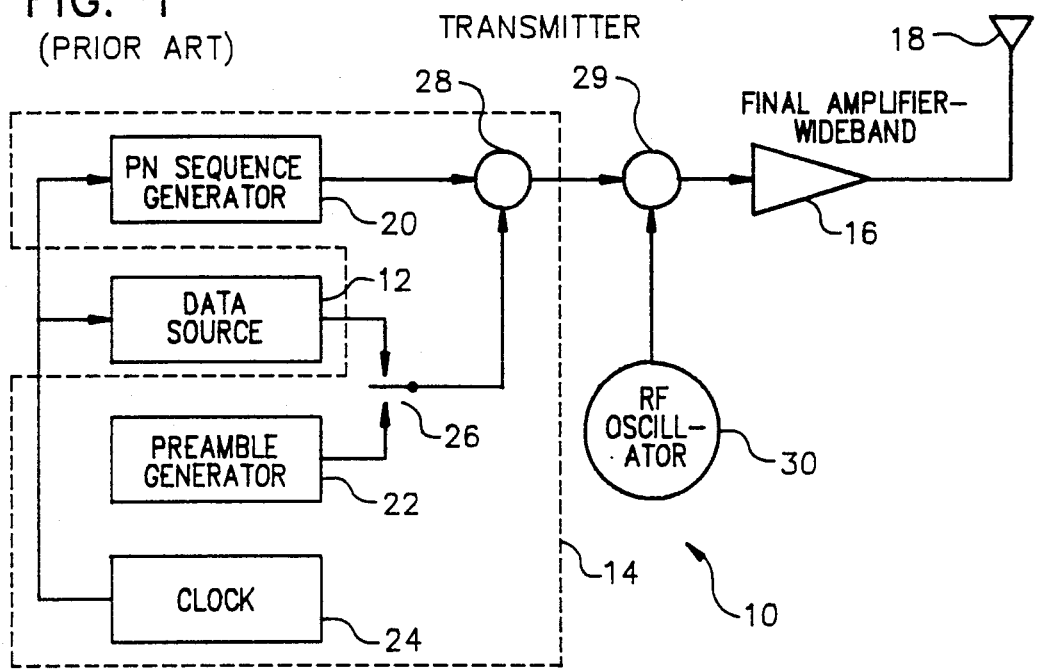
FIG. 1 is a block diagram of a direct sequence transmitter for use in a spread spectrum communication system known in the prior art.

FIG. 1 is a block diagram of a direct sequence transmitter for use in a spread spectrum communication system known in the prior art. The direct sequence transmitter 10 includes a data (or digital modulation) source 12, preamble and PN sequence select circuitry 14, an RF oscillator 30, a mixer 29, a wide band final amplifier 16 and a transmit antenna 18. The preamble and PN sequence select circuitry 14 includes a PN sequence generator 20, a preamble generator 22, and a clock 24 driving both the PN sequence generator 20 and the preamble generator 22. A switch 26 selects between the output of the PN sequence generator 20 and the output of the data source 12. The composite signal generated at the output by proper choice of the signals by the switch 26 therefore constitutes a modulated signal consisting of a selected preamble followed by the data to be transmitted. The preamble includes information which can be used to identify the source of the data, or the transmitter (or both), as well as containing additional information concerning conditions under which the data are to be transmitted.

The switch 26 transmits the selected output signal to a mixer 28. The PN sequence is clocked at a much faster rate than the modulation of the digital signal produced by the data source 12. The mixer 28 mixes the selected output signal with the output of a radio frequency (RF) generator 30 and, accordingly, produces a very fast composite signal.

The output of the mixer 28 is then mixed with the output of the RF oscillator 30 in the mixer 29 and the output of the mixer 29 is amplified in the wide band final amplifier 16 before the resulting signal is transmitted by the antenna 18.

Figure 2:
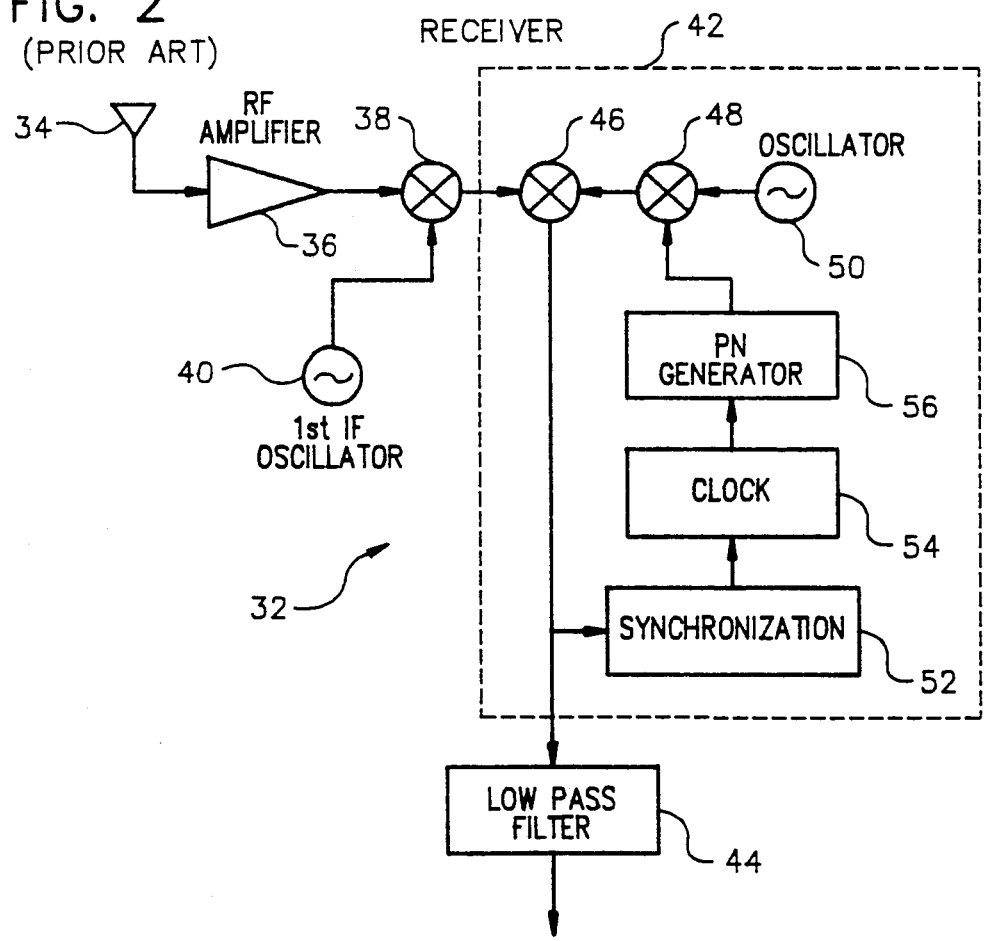
FIG. 2 is a block diagram of a direct sequence receiver for use in a spread spectrum communication system known in the prior art.

FIG. 2 is a block diagram of a direct sequence receiver for use in a spread spectrum communication system known in the prior art. The direct sequence receiver 32 includes a receive antenna 34, an RF amplifier 36, a mixer 38, a first RF oscillator 40, a despread circuit 42 and a low-pass filter 44. The receive antenna 34 receives the transmitted spread spectrum signal, which is amplified by the RF amplifier 36. The output of the RF amplifier 36 is then demodulated in the mixer 38 by the output of the first RF oscillator 40, to remove the carrier frequency from the received signal and produce a signal at a baseband frequency. The demodulated signal produced by the mixer 38 is processed by the despread circuit 42 to produce the digital information contained in the received spread spectrum signal.

The despread circuit 42 includes an output mixer 46, a baseband mixer 48 and a baseband oscillator 50. In addition, the despread circuit 42 includes a synchronization processor 52, a clock 54 and a PN generator 56. The processing circuits in the despread circuit 42 constitute a correlator and mix the output of the baseband oscillator 50 with the output of the PN generator 56. The processing circuits in the despread circuit 42 then mix the output of the baseband mixer 48 with the incoming baseband RF signal produced by the mixer 38. The information in the received spread spectrum signal is then contained in the digital signal produced by the output mixer 46 and all interference received with the received spread spectrum communication system signal is spread to noise.

The PN generator 56 is driven by the clock 54, which is kept synchronized to the output of the mixer 38 by the synchronization processor 52. The output of the output mixer 46 is filtered by the low-pass filter 44 which removes some of the noise to which the interference is transformed by the output mixer 46.

Figures 3, 3A:
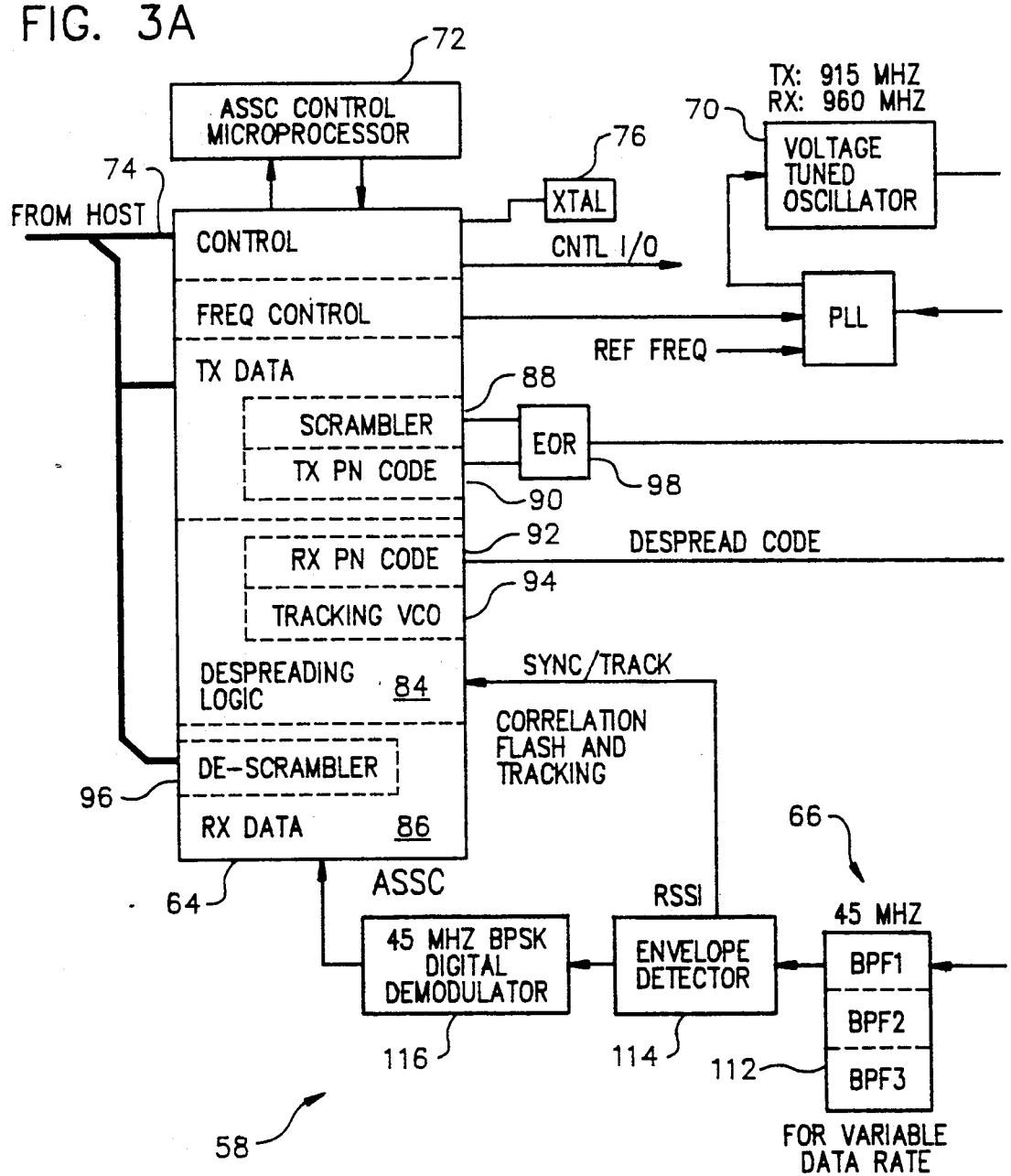
FIG. 3 is a block diagram of a direct sequence transceiver in accordance with the present invention.
Figure 3B:
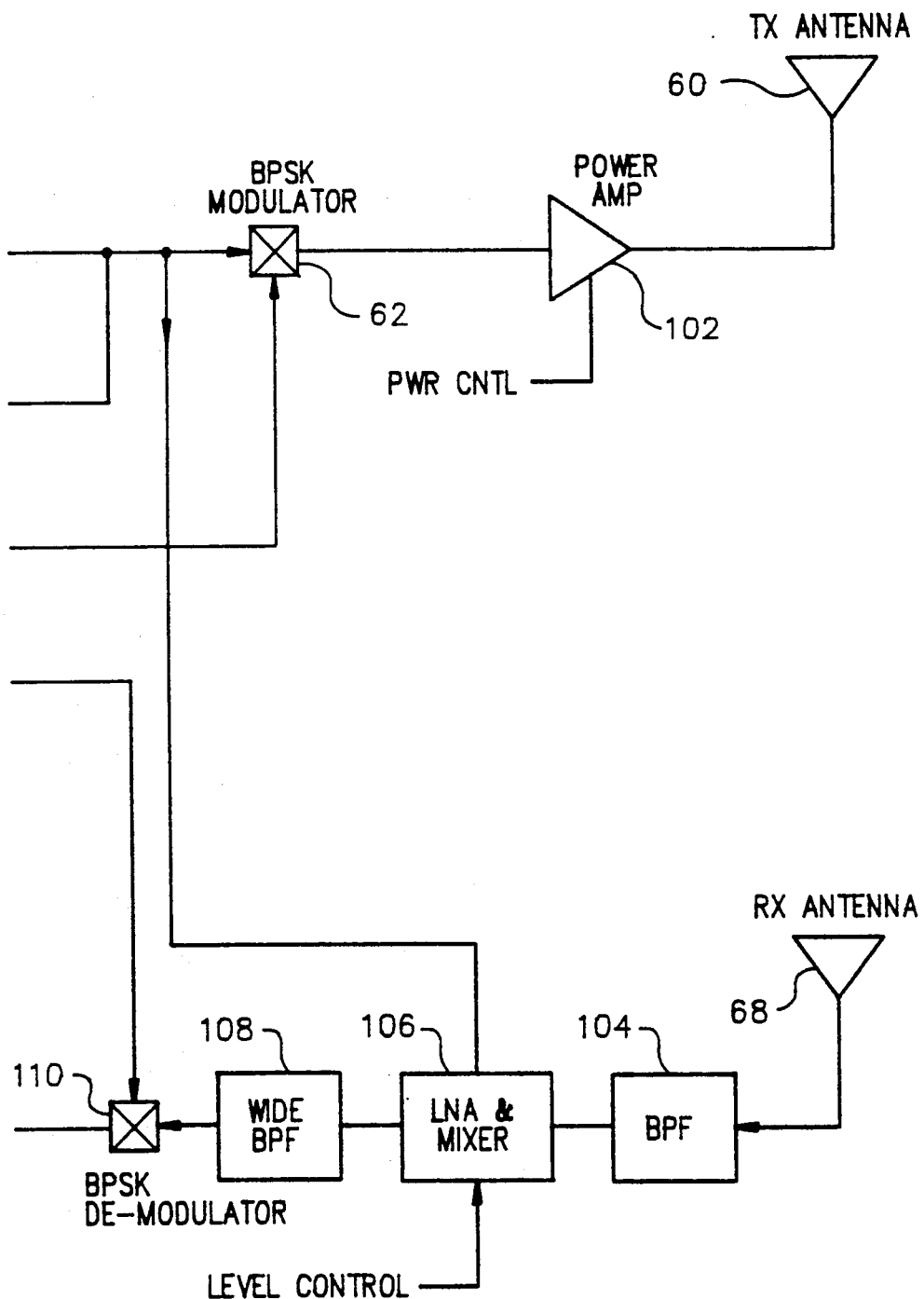

FIG. 3 is a block diagram of a direct sequence transceiver in accordance with the present invention. The direct sequence transceiver 58 includes a transmit antenna 60, associated modulation and amplification circuitry 62, a signal processing circuit 64, associated amplification and demodulation circuitry 66, a receive antenna 68 and a signal source 70. The signal source drives both the modulation and amplification circuitry 62 and the amplification and demodulation circuitry 66. The signal processing circuit 64 is controlled by a control microprocessor 72 and receives and transmits control signals and data from and to a host 74 (not shown). The control microprocessor 72 is programmed according to conventional programming practices well-known to those skilled in the art of computer programming and according to design principles well-known by those skilled in the art of spread spectrum communication systems control. The signal processing circuit 64 receives a frequency signal from a crystal 76 and synchronization/tracking and demodulated digital data signals from the amplification and demodulation circuitry 66.

The signal processing circuit 64 (which may comprise a programmed microprocessor) performs various tasks, such as control tasks 78, frequency control tasks 80, transmit data preparation tasks 82, despreading tasks 84, and receive data preparation tasks 86. The transmit data preparation tasks 82 include a scrambler 88 and a transmit PN code generator 90. The despreading tasks 84 include a receive PN code generator 92 and a tracking voltage controlled oscillator (VCO) 94. The receive data preparation tasks 86 include a descrambler 96.

To transmit a spread spectrum signal, the direct sequence transceiver 58 receives the control and data signals from the host 74. These signals are respectively sent to the control tasks 78 and the transmit data preparation tasks 82. The control tasks 78 receive a clock signal from the crystal 76 and produce control input-/output signals for use in control functions as well as use by monitoring programs which do not affect the operation of the direct sequence transceiver 58. The scrambler 88 and the transmit PN code generator 90 in the transmit data preparation tasks 82 respectively scramble the data to be transmitted (if desired) and generate the transmit PN code. These two tasks then produce respective streams of data that are combined in an exclusive-OR gate 98 and transmitted to a binary phase-shift keyer (BPSK) 100 in the modulation and amplification circuitry 62. Simultaneously, the signal source 70 produces a carrier frequency signal that is also transmitted to the BPSK 100. The BPSK 100 mixes the two signals it receives and sends a properly modulated signal to a controllable power amplifier 102 for amplification before transmission by the transmit antenna 60. The controllable power amplifier 102 is controlled by a control signal produced by the control tasks 78.

A spread spectrum signal intended for the transceiver 58 is first received by the receive antenna 68. It is then filtered by the band pass filter 104 in the amplification and demodulation circuitry 66 and then mixed with the output signal produced by the signal source 70 in the controllable mixer 106. The controllable mixer 106 is under the control of the control I/O signals produced by the control tasks 78. Following further filtering of the mixed signal by the wide bandpass filter 108, the filtered signal is demodulated by the despread code produced by the receive PN code generator 92, in the demodulator 110. The output of the demodulator 110 is further filtered in a selected bandpass filter 112 (selected in accordance with signals produced by the control I/O task 78) and the resulting signal processed by an envelope detector 114. The envelope detector 114 produces a synchronization/tracking signal and a BPSK-modulated digital data signal. The synchronization/tracking signal is received by the despreading logic 84 in the signal processing circuit 64, which uses the signal to control the receive PN code generator 92 and the tracking VCO 94. The BPSK-modulated digital data signal is demodulated in the demodulator 116 and the output transmitted to the receive data task 86 for further processing (including descrambling, if the received signal is scrambled). The resulting digital data is then transmitted from the signals processing circuit 64 to the host 74, for further use.

FIG. 4 is a flow chart of the overall method of the present invention. This method is implemented by a conventionally programmed computer to achieve the aims of the invention. After initiation (step 118), the method depends upon whether an original link (i.e., a transmission connection between a first transmitter (part of a transceiver such as that shown in FIG. 3) at a first station and a second receiver (also part of a transceiver such as that shown in FIG. 3)) is established (step 120). If an original link cannot be established, the method establishes an alternate original link (step 122) and selects an alternate PN sequence generator, such as a Gold code generator (step 124). Regardless of the circumstances of establishing an original link, the method then establishes a minimum bandwidth which will allow the spread spectrum communication system of the present invention to operate acceptably (step 126). Then an appropriate narrowband channel is selected (step 128).

Figure 5B:
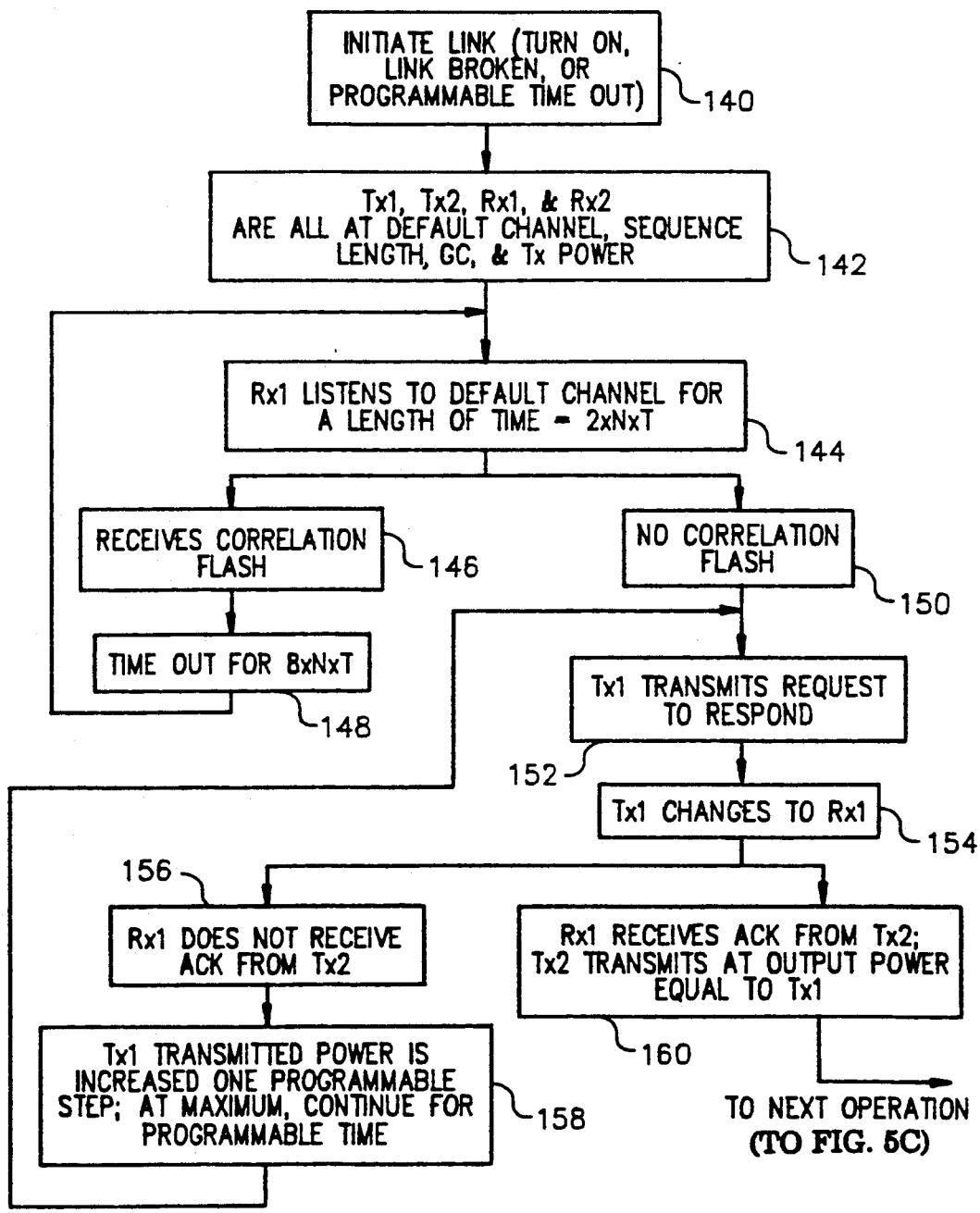

FIGS. 5A-5E are a detailed flow chart of the overall method of the present invention. FIG. 5A is a flow chart of the original link establishment of step 120 in FIG. 4. The link is initiated (step 130) and the receiver and transmitter portions of the transceivers at the first and second stations are all set at default sequence length, Gold codes and transmit powers (step 132). Then the transmitter at the first station broadcasts on a first channel for a length of time equal to the number of channels in the spread spectrum communication system, times a factor of four times the total duration of time that the transceiver normal spends at each channel in accordance with the chipping rate (i.e., the sequence length times the period of each bit in the PN sequence). The receiver at the first station listens for half of that time on the first channel. Next the transmitter and receiver at the first station repeat these steps for each successive channel until the first receiver receives an acknowledgement signal from a transmitter at the second station (step 134). During this time the receiver at the second station continually listens for each channel for a duration of time equal to the time that the receiver at the first station listens.

If the receiver at the first station does not receive an acknowledgement from the second transmitter (branch 136), the transmitted power at the first transmitter is increased by one programmable step (if possible to increase the transmitted power) (step 138) and the program then returns to step 134. If the first receiver receives an acknowledgement from the second transmitter, the second transmitter thereafter transmits at the same output power level as the first transmitter used to connect to the second receiver.

FIG. 5B is a flow chart of the alternate link establishment process of step 122 in FIG. 4. The link is initiated, as in step 130 of FIG. 5A (step 140), and the transceivers at the first and second stations are set to default spread spectrum parameters, as in step 132 of FIG. 5A (step 142). Next the first receiver monitors a default channel for a length of time equal to twice the sequence length times the duration of each bit (step 144). If the first receiver receives a correlation flash (step 146), the first receiver times out for a period of eight times the sequence length times the duration of each bit (step 148) and then returns to step 144. If the first receiver does not receive a correlation flash (step 150), the first transmitter transmits a request to respond (step 152) and the first transceiver changes to receive mode from transmit mode (step 154).

If the first transceiver does not receive an acknowledgement signal from the second transmitter (step 156), the transmitted power of the first transmitter is increased one programmable step (if possible) (step 158), and the method returns to step 152. If, however, the first receiver does receive an acknowledgement signal from the second transmitter, the second transmitter is programmed to transmit at the same output power as the first transmitter (step 160).

Figure 5C:
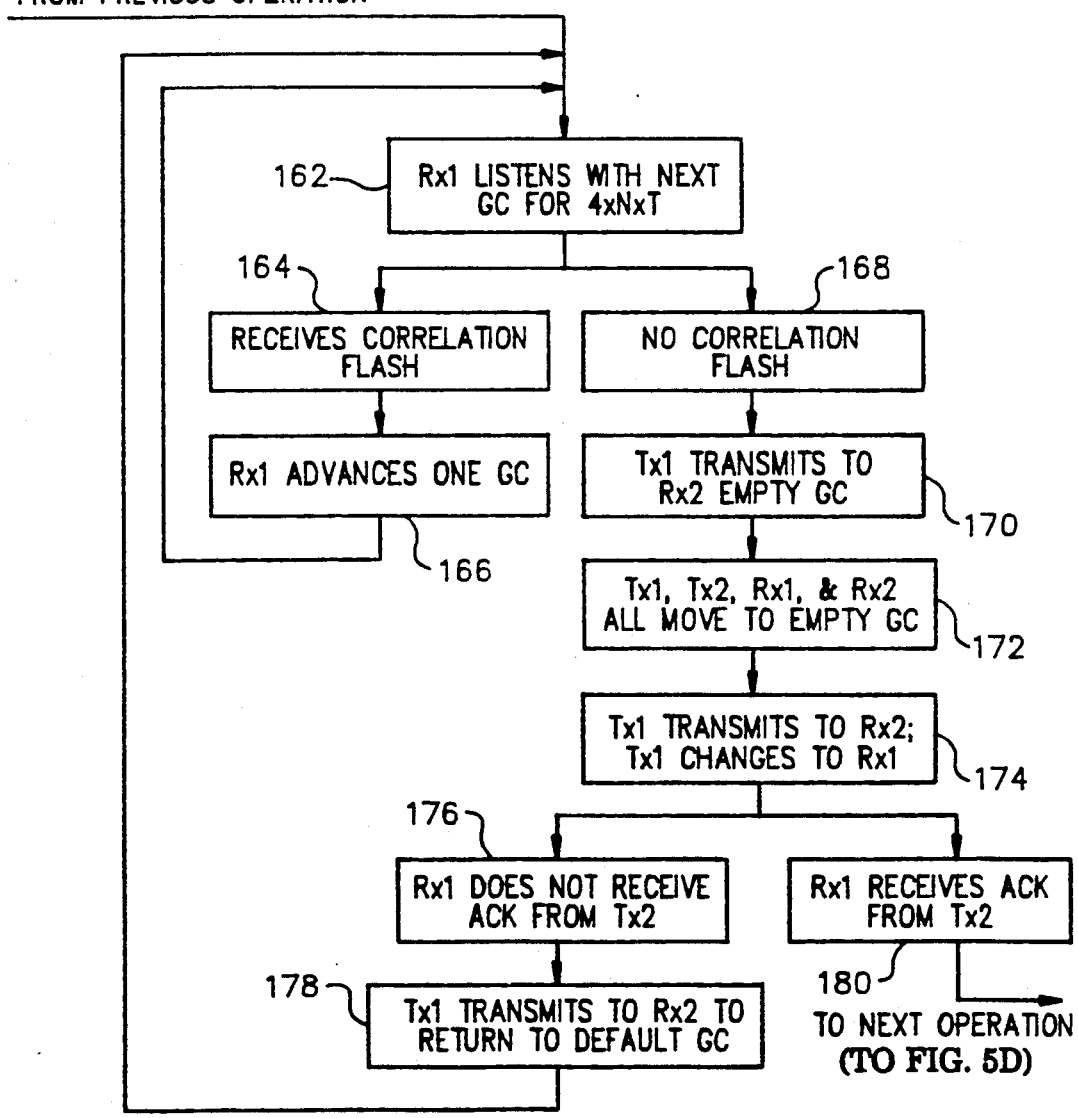

Operation of the method then progresses to the Gold code selection process shown in step 124 of FIG. 4. A flow chart of the Gold code selection process is shown in FIG. 5C. In this step the first receiver chooses a Gold code from a predetermined list and monitors the received signals for a period of time equal to four times the sequence length times the duration of each sequence bit (step 162). If the first transceiver receives a correlation flash (step 164), it then advances its choice of Gold code by one (step 166) and returns to step 162. If the first receiver receives no correlation flash (step 168), the first transmitter transmits an empty Gold code to the second receiver (step 170), causing the receiver and transmitter sections of both the first and second transceivers to move to the empty Gold code (step 172). Thereafter, the first transmitter transfers control to the receiver at the second station and the first transceiver changes to receive mode from transmit mode (step 174). If the first receiver does not receive an acknowledgement signal from the second transmitter (step 176), the first transmitter transmits to the second receiver to cause the second receiver to return to the default Gold code (step 178) and the program returns to step 162. If the first receiver does receive an acknowledgement signal from the second transmitter (step 180), the method then moves to the step of establishing the minimum bandwidth (step 126 of FIG. 4).

Figure 5D:
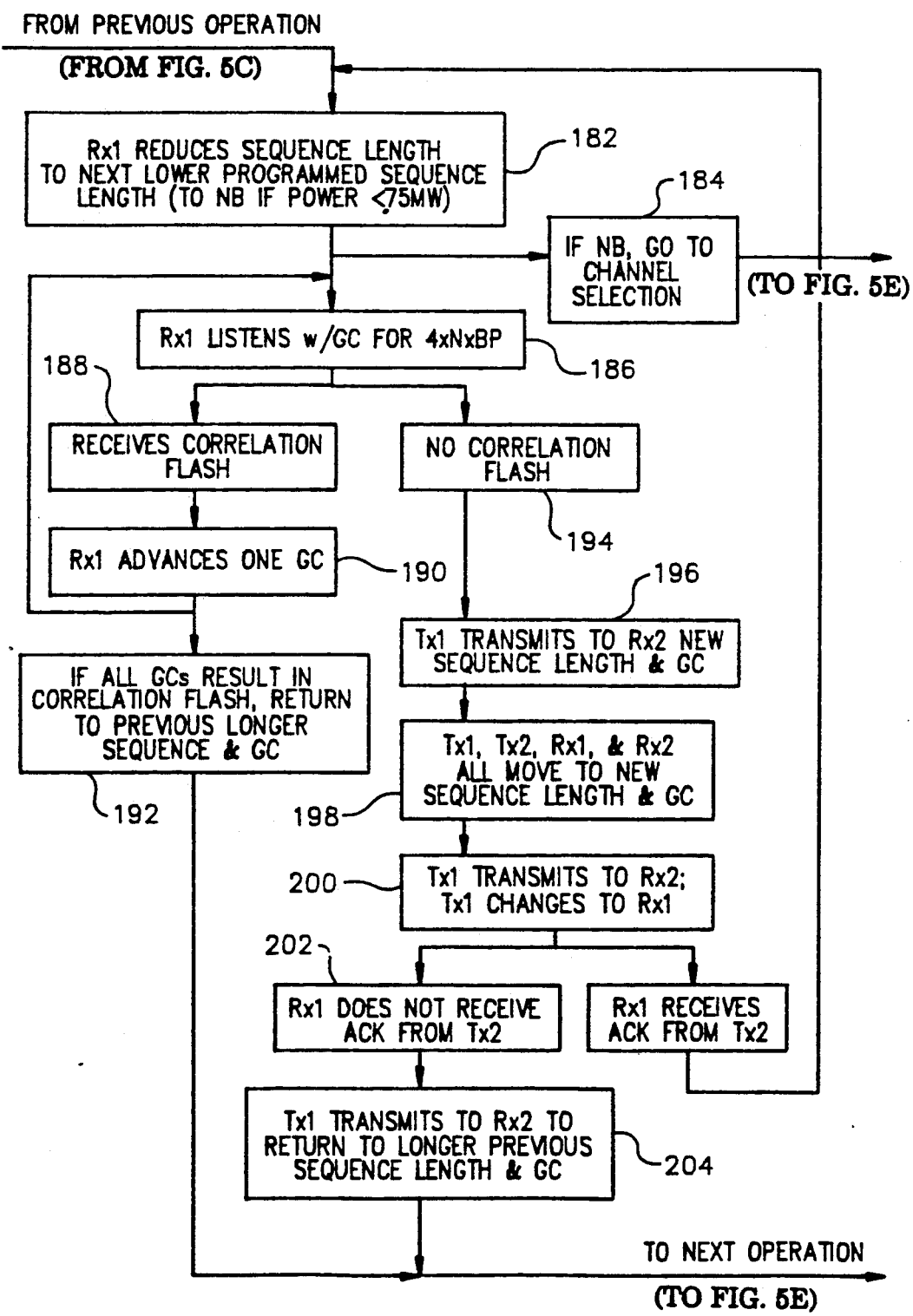

FIG. 5D is a flow chart of the process of establishing minimum bandwidth, shown in step 126 of FIG. 4. In step 126, the first receiver reduces the sequence length to the next lower programmed sequence length, or to a narrowband operation, if the power output is less than 0.75 mW (step 182). If the receiver changes to narrowband operation, the program moves to step 128 in FIG. 4 (step 184). Otherwise, the first receiver listens with the current selection of Gold code for a time equal to four times the sequence length times the duration of a bit (step 186). If the transceiver receives a correlation flash (step 188), the first receiver advances one Gold code (step 190). If all Gold codes result in a correlation flash, the sequence selected return to a previous longer sequence and Gold code (step 192). Otherwise, the method returns to step 186.

If the receiver develops no correlation flash (step 194), the first transmitter transmits a new sequence length and Gold code to the second receiver (step 196) and the first and second transceivers all move to the new sequence length and Gold code (step 198). Thereafter, the first transmitter transmits to the second receiver and then the first transceiver changes from transmit mode to receive mode (step 200). If the first receiver does not receive an acknowledgement signal from the second transmitter (step 202), the first transmitter transmits to the second receiver to return to the longer previous sequence length and Gold code (step 204) and moves to the next operation, step 128 in FIG. 4. Otherwise, if the first receiver an acknowledgement signal from the second transmitter (step 206), the method returns to step 182.

Figure 5E:
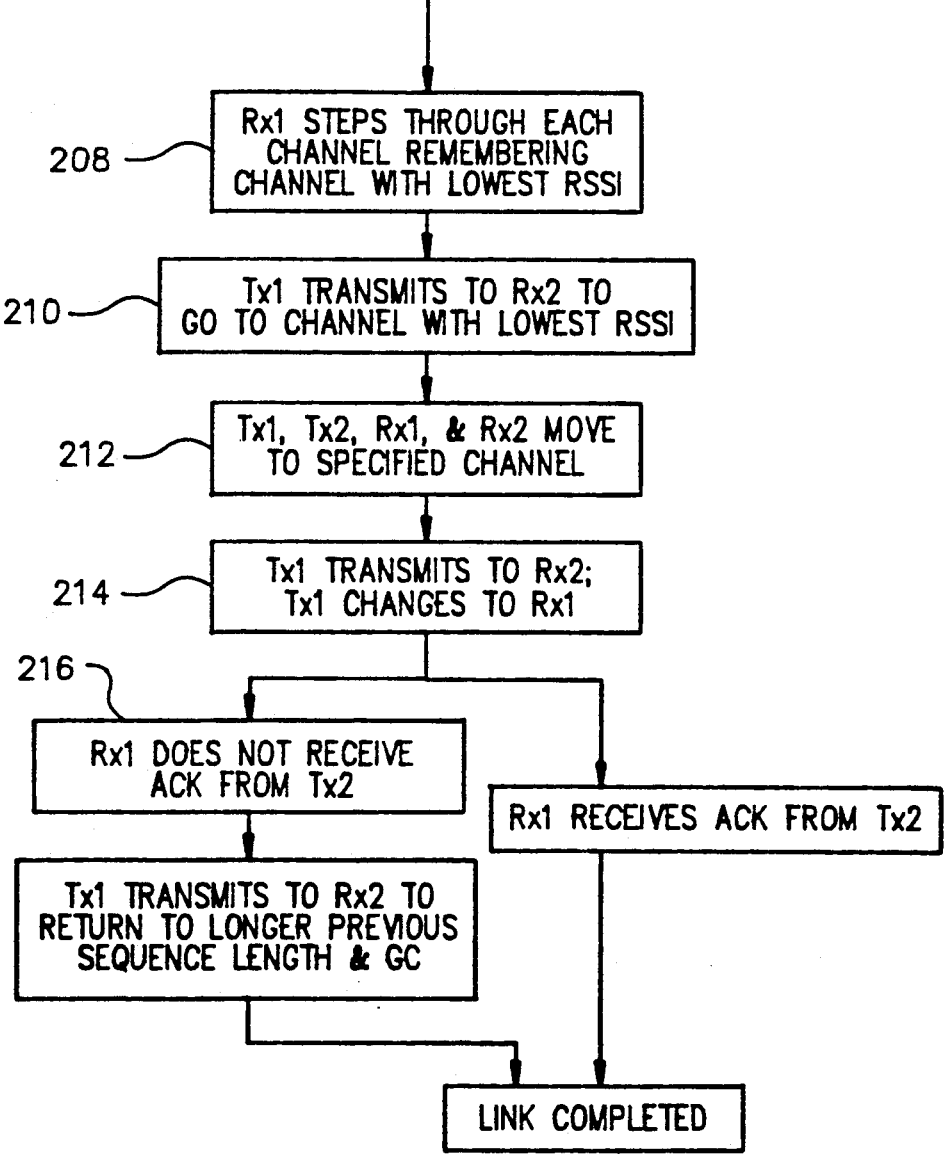

FIG. 5E shows a flow chart for the narrowband channel selection process, step 128 in FIG. 4. In this process, the first receiver step through each channel, while remembering the channel with the lowest RSSI (step 208). Then the first transmitter transmits to the second receiver to go to the channel with the lowest RSSI (step 210) and the first and second transceivers both move to the specified channel (step 212). Following this, the first receiver transmits to the second receiver and the first transceiver changes from transmit mode to receive mode (step 214). If the first receiver does not receive an acknowledgement signal from the second transmitter (step 216), the first transmitter transmits to the second receiver to return to the longer previous sequence length and Gold code (step 218), and the link has been completed (step 220). Otherwise, the first receiver receives an acknowledgement signal from the second transmitter and the link has been completed (step 220).

We claim:

1. A method for communicating between a first station and a second station over a plurality of communication channels, the first station including a first transmitter and a first receiver and the second station including a second transmitter and a second receiver, the second receiver at the second station sequentially monitoring each of the channels in the plurality of communication channels for communication signals transmitted by the first transmitter at the first station for a predetermined period of time, the method comprising the steps of:

a) initiating the establishment of a link of communication channels between the first station and the second station, each of the communication channels of the link being characterized by a predetermined set of spread spectrum parameters, each parameter taking a value in a range of values such that the communication reliability of a communication channel changes monotonically as the value of the corresponding parameter changes from one extreme of the range to the other extreme of the range;

b) determining whether the link is established between the first station and the second station;

c) if the link is not established, broadcasting communication signals from the first transmitter to the second receiver over a first one of the plurality of communication channels for a period of time equal to the total period of time over which the second receiver monitors the channels in the plurality of communication channels;

d) if the link is not established after performing step c), changing one of the parameters in at least one of the predetermined sets of spread spectrum parameters at the first station and returning to step b);

e) if the link is established after performing step c), changing the one of the parameters in the at least one of the predetermined sets of spread spectrum parameters at the second station;

f) monitoring the spread spectrum parameters associated with each channel in the plurality of communication channels to determine which channel in the plurality of communication channels is characterized by spread spectrum parameters, at least one of which has a critical value that establishes a communication reliability that is the smallest possible greater than a predetermined communication reliability between the first station an the second station;

g) transmitting a communication signal from the first station to the second station, the communication signal including information identifying which channel in the plurality of communication channels has a spread spectrum parameter that has a critical value; and h) causing the first and second transmitters and the first and second receivers to change to the channel in the plurality of communication channels that has the spread spectrum parameter that has a critical value.

2. The method of claim 1 wherein the parameter in the plurality of spread spectrum parameters is transmitter power.

3. The method of claim 2 wherein the parameter in the plurality of spread spectrum parameters is sequence length.

4. The method of claim 1, further comprising the steps of:
 i) adjusting a second parameter in the plurality of spread spectrum parameters to reduce the communication reliability between the first station and the second station to a critical value;
 j) testing the link between the first station and the second station;
 k) if the link between the first station and the second station is still established after performing step j), determining whether the values of the first parameter and the second parameter in the plurality of spread spectrum parameters both have critical values that establish the communication reliability between the first station and the second station;
 l) if the values of the first parameter and the second parameters in the plurality of spread spectrum parameters have critical values, changing the communication mode between the first station and the second station to communication in a single narrowband channel;
 m) if the link is not established after performing step l), changing the second parameter to the value it had before performing step i);
 n) if the values of the first parameter and the second parameters in the plurality of spread spectrum parameters are not both at their respective critical values, returning to step i);
 o) if the link between the first station and the second station is not still established after performing step j), returning the value of the second parameter in the plurality of spread spectrum parameters to the value it had before performing step i); and
 p) otherwise, establishing the values of the first and second parameters in the plurality of spread spectrum parameters.

5. The method of claim 4 wherein the first parameter in the plurality of spread spectrum parameters is transmitter power.

6. The method of claim 5 wherein the second parameter in the plurality of spread spectrum parameters is sequence length.

7. The method of claim 4 wherein the second parameter in the plurality of spread spectrum parameters is sequence length.

8. An apparatus for communicating between a first station and a second station over a plurality of communication channels, the first station including a first transmitter and a first receiver and the second station including a second transmitter and a second receiver, the second receiver at the second station sequentially monitoring each of the channels in the plurality of communication channels for communication signals transmitted by the first transmitter at the first station for a predetermined period of time, the apparatus comprising:
 means for initiating a link of communication channels between the first station and the second station, each of the communication channels of the link using a predetermined set of spread spectrum parameters, each parameter taking a value in a range of values such that the communication reliability of a communication channel changes monotonically as the value of the corresponding parameter changes from one extreme of the range of the other extreme of the range;
 means for determining whether the link is established between the first station and the second station;
 means for broadcasting communication signals from the first transmitter to the second receiver over a first one of the plurality of communication channels for a period of time equal to the total period of time over which the second receiver monitors the channels in the plurality of communication channels, if the link is not established;
 means for changing one of the parameters in at least one of the predetermined sets of spread spectrum parameters at the first station if the link is not established;
 means for changing the one of the parameters in the predetermined set of spread spectrum parameters in the at least one of the predetermined sets of spread spectrum parameters at the second station;
 means for monitoring the spread spectrum parameters associated with each channel in the plurality of communication channels to determine which channel in the plurality of communication channels is characterized by spread spectrum parameters, at least one of which has a critical value that establishes a communication reliability that is the smallest possible greater than a predetermined communication reliability between the first station and the second station;
 means for transmitting a communication signal from the first station to the second station, the communication signal including information identifying which channel in the plurality of communication channels has a spread spectrum parameter that has a critical value; and
 means for causing the first and second transmitters and the first and second receivers to change to the channel in the plurality of communication channels that has the spread spectrum parameter that has a critical value.

9. The apparatus of claim 8 wherein the parameter in the plurality of spread spectrum parameters is transmitter power.

10. The apparatus of claim 9 wherein the parameter in the plurality of spread spectrum parameters is sequence length.

11. The apparatus of claim 8, further comprising:
 means for adjusting a second parameter in the plurality of spread spectrum parameters to reduce the reliability of communication between the first station and the second station;
 means for testing the link between the first station and the second station;
 means for determining whether the first parameter and the second parameter in the plurality of spread spectrum parameters both have critical values;
 means for changing the communication mode between the first station and the second station to communication in a single narrowband channel;
 means for returning the value of the first parameter in the plurality of spread spectrum parameters to the value it had previously;
 means for returning the value of the second parameter in the plurality of spread spectrum parameters to the value it had previously; and means for establishing the values of the first and second parameters in the plurality of spread spectrum parameters.

12. The apparatus of claim 11 wherein the first parameter in the plurality of spread spectrum parameters is transmitter power.

13. The apparatus of claim 12 wherein the second parameter in the plurality of spread spectrum parameters is sequence length.

14. The apparatus of claim 11 wherein the second parameter in the plurality of spread spectrum parameters is sequence length.

15. An apparatus for communicating between a first station and a second station over a plurality of communication channels, the second receiver at the second station sequentially monitoring each of the channels in the plurality of communication channels for communication signals transmitted by the first transmitter at the first station for a predetermined period of time, the first station including a first transmitter and a first receiver and the second station including a second transmitter and a second receiver, the apparatus comprising:

a first circuit to initiate a link of communication channels between the first station and the second station, each of the communication channels of the link being characterized by a predetermined set of spread spectrum parameters, each parameter taking a value in a range of values such that the communication reliability of a communication channel changes monotonically as the value of the corresponding parameter changes from one extreme of the range to the other extreme of the range;

a second circuit to determine whether the link is established between the first station and the second station;

a transmitter circuit to broadcast communication signals from the first transmitter to the second receiver over a first one of the plurality of communication channels for a period of time equal to the total period of time over which the second receiver monitors the channels in the plurality of communication channels, if the link is not established;

a third circuit to change one of the parameters in at lest one of the predetermined sets of spread spectrum parameters at the first station if the link is not established;

a fourth circuit to change the one of the parameters in the at least one of the predetermined sets of spread spectrum parameters at the second station;

a fifth circuit to monitor the spread spectrum parameters associated with each channel in the plurality of communication channels to determine which channel in the plurality of communication channels is characterized by spread spectrum parameters, at least one of which has a critical value that establishes a communication reliability that is the smallest possible greater than a predetermined communication reliability;

a first transmitter circuit to transmit a communication signal from the first station to the second station, the communication signal including information identifying which channel in the plurality of communication channels has a spread spectrum parameter that has a critical value; and a sixth circuit to cause the first and second transmitters and the first and second receivers to change to the channel in the plurality of communication channels that has the spread spectrum parameter that has a critical value.

16. The apparatus of claim 15 wherein the parameter in the plurality of spread spectrum parameters is transmitter power.

17. The apparatus of claim 16 wherein the parameter in the plurality of spread spectrum parameters is sequence length.

18. The apparatus of claim 15, further comprising:
a seventh circuit to adjust a second parameter in the plurality of spread spectrum parameters to reduce the reliability of communication between the first station and the second station;
an eighth circuit to test the link between the first station and the second station;
a ninth circuit to determine whether the values of the first parameter and the second parameters in the plurality of spread spectrum parameters are both at extremes which minimize the reliability of communication between the first station and the second station;
a tenth circuit to change the communication mode between the first station and the second station to communication in a single narrowband channel;
an eleventh circuit to change the second parameter to the value it had previously;
a twelfth circuit to return the value of the second parameter in the plurality of spread spectrum parameters to the value it had previously; and
a thirteenth circuit to establish the values of the first and second parameters in the plurality of spread spectrum parameters.

19. The apparatus of claim 18 wherein the first parameter in the plurality of spread spectrum parameters is transmitter power.

20. The apparatus of claim 19 wherein the second parameter in the plurality of spread spectrum parameters is sequence length.

21. The apparatus of claim 18 wherein the second parameter in the plurality of spread spectrum parameters is sequence length.

22. The apparatus of claim 18 wherein the first, second, third, fourth, fifth and sixth circuits are a programmed arithmetic-logic unit.

23. The apparatus of claim 18 wherein the seventh, eighth, ninth, tenth, eleventh, twelfth and thirteenth circuits are a programmed arithmetic-logic unit.

* * * * *